(12) United States Patent
Lu et al.

(10) Patent No.: US 11,182,183 B2
(45) Date of Patent: Nov. 23, 2021

(54) WORKLOAD PLACEMENT USING CONFLICT COST

(71) Applicant: VMware, Inc., Palo Alto, CA (US)

(72) Inventors: Xunjia Lu, Palo Alto, CA (US); Haoqiang Zheng, Palo Alto, CA (US); David Dunn, Bellevue, WA (US); Fred Jacobs, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 185 days.

(21) Appl. No.: 16/511,308

(22) Filed: Jul. 15, 2019

(65) Prior Publication Data

US 2021/0019159 A1    Jan. 21, 2021

(51) Int. Cl.
*G06F 9/455* (2018.01)
*G06F 9/50* (2006.01)

(52) U.S. Cl.
CPC .......... *G06F 9/45533* (2013.01); *G06F 9/505* (2013.01); *G06F 9/5016* (2013.01); *G06F 9/5083* (2013.01); *G06F 2009/4557* (2013.01)

(58) Field of Classification Search
CPC combination set(s) only.
See application file for complete search history.

(56) References Cited

U.S. PATENT DOCUMENTS

| | | | | |
|---|---|---|---|---|
| 2013/0185722 A1* | 7/2013 | Kruglick | ............ | G06Q 10/063 718/1 |
| 2016/0380907 A1* | 12/2016 | Zhu | ............ | H04L 67/1008 709/201 |
| 2020/0341811 A1* | 10/2020 | Rostykus | ............ | G06F 9/5016 |
| 2020/0379907 A1* | 12/2020 | Rostykus | ............ | G06F 9/5044 |

* cited by examiner

*Primary Examiner* — Dong U Kim
(74) *Attorney, Agent, or Firm* — Thomas Horstemeyer, LLP

(57) ABSTRACT

Disclosed are various embodiments that utilize conflict cost for workload placements in datacenter environments. In some examples, a protected memory level is identified for a computing environment. The computing environment includes a number of processor resources. Incompatible processor workloads are prohibited from concurrently executing on parallel processor resources. Parallel processor resources share memory at the protected memory level. A number of conflict costs are determined for a processor workload. Each conflict cost is determined based on a measure of compatibility between the processor workload and a parallel processor resource that shares a particular memory with the respective processor resource. The processor workload is assigned to execute on a processor resource associated with a minimum conflict cost.

20 Claims, 4 Drawing Sheets

WORKLOAD PLACEMENT USING CONFLICT COST

BACKGROUND

Enterprises can employ software defined datacenters in order to provide compute, memory, storage, network, and other resources for enterprise workloads. The workloads, which can be embodied in applications or virtual machines, can represent demands for the software defined datacenter. The hosts can include compute, memory, storage, network, and other resources that are utilized for the enterprise workloads.

Processing architectures can involve shared memories. The shared memories can include caches shared between threads, such as symmetric multithreading threads, of a core, caches shared between cores of a processor, memory modules shared between groups of processors, and others. When multiple workloads are assigned to shared memories, faults and security issues can arise. For example, a side channel cache timing vulnerability or level one terminal fault (L1TF) can occur. Such a vulnerability can allow unauthorized disclosure of information residing in a L1 data cache, shared between threads of a core. Accordingly, steps should be taken to prevent these potential vulnerabilities.

One existing solution to the L1TF vulnerability can be to permanently prevent or disable multithreading. However, this solution can negate the benefits of multithreading and cause processor inefficiencies. In addition, disabling multithreading would only prevent vulnerabilities for caches shared between threads of a core. Accordingly, there is a need for more improved solutions that can utilize multithreading and other architectures that involve shared memories while maintaining security.

BRIEF DESCRIPTION OF THE DRAWINGS

Many aspects of the present disclosure can be better understood with reference to the following drawings. The components in the drawings are not necessarily to scale, with emphasis instead being placed on clearly illustrating the principles of the disclosure. Moreover, in the drawings, like reference numerals designate corresponding parts throughout the several views.

DETAILED DESCRIPTION

Disclosed are various approaches for workload placement using conflict costs. Processing architectures can involve shared caches and other memories. The shared memories can include caches shared between threads of a core or central processing unit (CPU), caches shared between cores of a processor, memory modules shared between groups of a processor such as uniform memory access (UMA), non-uniform memory access (NUMA), and others. When multiple workloads are assigned to shared memories, vulnerabilities can arise. Existing security features can only provide security benefits by disabling multithreading, UMA, NUMA, and other architectures. However, the present disclosure describes improved mechanisms that can prevent potential vulnerabilities at various shared memory levels by implementing workload placement using conflict costs. Conflict cost can be an efficiency loss metric or measure of inefficiency caused by placing or assigning a particular workload to a particular processing element. Accurately predicting the conflict cost for a workload can allow a scheduling service to maintain security and maximize efficiency of the datacenter as a whole. The described mechanisms can maintain a desired security level while utilize multithreading, UMA, NUMA, and other architectures that involve memories shared among multiple processing elements such as threads, cores, central processing units, and processors.

Figure 1:
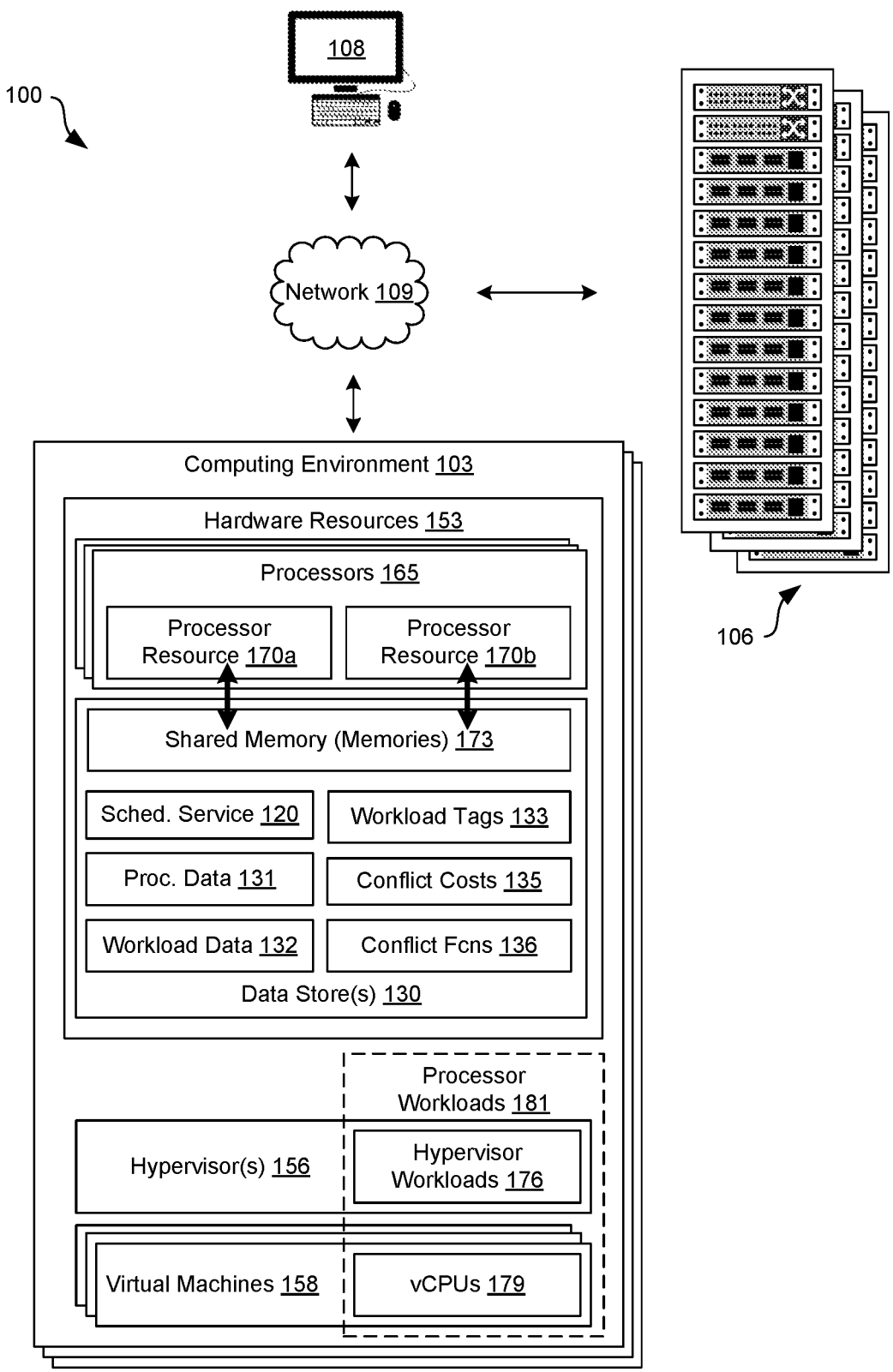
FIG. 1 is a drawing of an example of a networked environment according to various embodiments of the present disclosure.

With reference to FIG. 1, an example of a networked environment 100 is shown. The networked environment 100 can include a computing environment 103, various clusters 106, and one or more client devices 108 in communication with one another over a network 109. The network 109 can include wide area networks (WANs) and local area networks (LANs). These networks can include wired or wireless components, or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks. As the networked environment 100 can serve up virtual desktops to end users, the networked environment 100 can also be described as a virtual desktop infrastructure (VDI) environment.

In some examples, the computing environment 103 can include an enterprise computing environment that includes hundreds or even thousands of physical machines, virtual machines, and other software implemented in devices stored in racks, distributed geographically and connected to one another through the network 109. It is understood that any virtual machine or virtual appliance is implemented using at least one physical device.

The computing environment 103 can include, for example, a server or any other system providing computing capability. Alternatively, the computing environment 103 can include one or more computing devices that are arranged, for example, in one or more server banks, computer banks, clusters, or other arrangements. The computing environment 103 can include a grid computing resource or any other distributed computing arrangement. The computing devices can be located in a single installation or can be distributed among many different geographical locations. Although shown separately from the clusters 106, in some examples, the clusters 106 can be a portion of the computing environment 103. Various applications can be executed on the computing environment 103. For example, a scheduling service 120 can be executed by the computing environment 103. Other applications, services, processes, systems, engines, or functionality not discussed in detail herein may also be executed or implemented by the computing environment 103.

The computing environment 103 can include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the clusters 106 and client devices 108 for end users over the network 109, sometimes remotely, the computing environment 103 can be described as a remote computing environment 103 in some examples. Additionally, in some examples, the computing environment 103 can be implemented in hosts of a rack of the computer clusters 106, and can manage operations of a virtualized computing environment.

The computing environment 103 can include a data store 130. The data store 130 can include memory of the computing environment 103, mass storage resources of the computing environment 103, or any other storage resources on which data can be stored by the computing environment 103. In some examples, the data store 130 can include one or more relational databases, object-oriented databases, hierarchical databases, hash tables or similar key-value data stores, as well as other data storage applications or data structures. The data stored in the data store 130, for example, can be associated with the operation of the various services or functional entities described below. For example, various processor data 131, workload data 132, workload tags 133, conflict costs 135, and conflict functions 136 can be stored in the data store 130.

Processor data 131 can represent information related to processor resources 170 of the processors 165, as well as related hardware resources 153. Processor data 131 can include information such as the amount of memory installed on a host of the processor 165, the number and type of available processors 165, multithreading capabilities and settings for each processor 165, processor resources 170, such as the processor resources 170a and 170b, that share a shared memory or memories 173. For example, processor resources 170 can include threads of a core of the processors 165 that share caches, cores of the processors 165 that share caches, and groups of processors 165 that share other shared memories 173 over a bus. The shared memories 173 can include caches shared between threads, such as Intel® hyperthreads, symmetric multithreading threads, and other threads of a core, caches shared between cores of a processor, memory modules shared between groups of processors, and others. For example, the shared memories 173 can include level 1 (L1) caches, level 2 (L2) caches, level 3 (L3) caches, and so on up to a last level cache (LLC), as well as other memories such as those shared in an UMA or NUMA architecture.

Processor data 131 can also include information related to the processor workloads 181, including processor workloads 181 currently executed on each processor 165, as well as processor workloads 181 scheduled to be executed or stored for future execution. Processor workloads 181 can also be referred to as processing workloads. Processor data 131 can include a record of the processor workloads 181, including hypervisor workloads 176 and vCPUs 179, assigned to each processor resource 170. Processor data 131 can include a speed of each processor 165, the amount of allocated compute resources consumed by each processor workload 181.

Processor data 131 can also indicate free cycles for each thread, core, and processor 165.

Workload data 132 can represent information related to a processor workload 181 such as hypervisor workload 176 of a hypervisor 156 or a vCPU 179 of a virtual machine 158. For example, this information can include an identifier or name of the processor workload 181, as well as a processor resource 170 where the processor workload 181 is being processed or executed, such as a particular processor 165, or a core or thread of the processor 165. Workload data 132 can also include the number and type of processor workloads 181 that execute at a particular time, such as a current time or a future time. In addition, workload data 132 can indicate the workload tags 133 that are associated with a particular processor workload 181.

Each workload tag 133 can be associated with one or more processor workloads 181. For example, each hypervisor 156 workload and each vCPU of a virtual machine 158 can be associated with a respective workload tag 133. The workload tags 133 can indicate which processor workloads 181 are compatible with one another. Processor workloads 181 that include matching workload tags 133 can be compatible, while differing workload tags 133 can be incompatible. The scheduling service 120 can prevent conflicting processor workloads 181 from executing concurrently on parallel processor resources 170 and can prevent memory shared by the parallel processor resources 170 from being concurrently accessed by the conflicting or incompatible processor workloads 181. Compatible processor workloads 181 with matching workload tags 133 cause no conflict or incompatibility. The scheduling service 120 can permit or schedule concurrent execution of compatible processor workloads 181.

Scheduling service 120 can tag multiple vCPUs from the same virtual machine 158 with the matching workload tags 133, while vCPUs from another virtual machine 158 can be tagged with a different workload tag 133. Hypervisor workloads 176 from a hypervisor 156 can have yet another workload tag 133. Scheduling service 120 can assign or tag workload tags 133 according to each virtual machine 158 and each hypervisor 156. Scheduling service 120 can tag all vCPUs 179 in a group of virtual machines 158 to be compatible. Further, a set of virtual machines 158 and hypervisors 156 can belong to a first enterprise while another set of virtual machines 158 and hypervisors 156 can belong to another enterprise. Scheduling service 120 can tag all of processor workloads 181 with matching workload tags 133 according to an enterprise associated with the hypervisors 156 and virtual machines 158 of that enterprise. Accordingly, the scheduling service 120 can define compatibility for any set of processor workloads 181 using the workload tags 133. In some cases, the scheduling service 120 can include a graphical user interface or management console, and the scheduling service 120 can tag a processor workload 181 with workload tag 133 based on a user specification, such as a user selection of the workload tag 133 in association with a processor workload 181. In other cases, the scheduling service 120 can automatically assign workload tags 133 according to enterprise, enterprise subsection or division, virtual machine 158, or type of virtual machine 158.

The scheduling service 120 can schedule a processor workload 181 to execute on a particular processor resource 170. The scheduling service 120 can assign a processor workload 181 to a processor resource 170 based on the workload tags 133, as well as information identified from the processor data 131 and workload data 132. The scheduling service 120 can define a protected memory level at which the tagged processor workloads 181 are enforced as compatible and incompatible. For instance, scheduling service 120 can prevent processor workloads 181 with different workload tags 133 from sharing a cache such as a last level cache, while allowing sharing memories that are accessible over a system bus. In other situations, scheduling service 120 can prevent workloads that have different workload tags 133 from sharing caches as well as system memories accessible over a system bus. In order to prevent level one terminal fault (L1TF), the scheduling service 120 can prevent conflicting processor workloads 181 that have different workload tags 133 from concurrently executing on parallel threads that share an L1 cache of a core. However, conflicting processor workloads 181 can still be assigned to execute on parallel processor resources 170. This can result in a conflict cost 135, or loss of efficiency, because the scheduling service 120 can prevent conflicting processor workloads 181 from executing concurrently on parallel processor resources 170, even if multithreading (or UMA, NUMA, etc.) is active. Stated another way, scheduling service 120 can prevent memory shared by the parallel processor resources 170 from being concurrently accessed by the conflicting processor workloads 181.

Conflict costs 135 can indicate a measure of conflict between a particular processor workload 181 and current processor workloads 181 of a processor resource such as a thread, core, or processor 165. A conflict cost 135 can be the difference between a processor workload 181 and actual load if placed on a particular on processor resource 170. Conflict cost can be expressed as a time unit of measure, a processing unit of measure, a percentage of processing time, or a percentage of processing capacity. Conflict functions 136 can include equations or functions used to calculate conflict cost.

Equation (1) indicates conflict cost $ConflictCost_{W\_R0}$ to execute a processor workload W on processor resource R0.

$$ConflictCost_{W\_R0} = Load_W - ActualLoad \quad (1)$$

In other words the conflict cost $ConflictCost_{W\_R0}$ can be calculated as a difference between a nominal or unconflicted load of the processor workload W and ActualLoad. ActualLoad can be an actual load of the processor workload W when assigned to execute on processor resource R0, in consideration of compatible loads and incompatible loads currently assigned to execute on parallel processor resource R1. Processor resource R1 is parallel to processor resource R0 by sharing a memory at a protected memory level. R1 can represent all other processor resources that share a memory with R0 at the protected memory level. In one example, processor resources R0 and R1 can represent two threads that share a cache. Other examples can have any number of threads. In addition, processor resources R0 and R1 can represent multiple cores that share a cache, or multiple processors that share a memory.

Where thread R1 is fully saturated, or has no free cycles, ActualLoad can be calculated according to Equation (2).

$$ActualLoad = Load_W * \frac{CompatibleLoad_{R1}}{Load_{R1}} \quad (2)$$

This equation considers that processor workload W can only run on processor resource R0 when processor resource R1 is running compatible tags, for example, assuming proportional execution. Load R1 can refer to total current workloads of the processor resource R1. $CompatibleLoad_{R1}$ can refer to processor workloads 181 of the processor resource R1 that are compatible with processor workload W. $CompatibleLoad_{R1}$ can be a measure of compatibility between processor workload W and processor workloads currently assigned to parallel processor resource R1. In other words, $CompatibleLoad_{R1}$ can be a measure of compatibility between processor workload W and parallel processor resource R1. For example, the $CompatibleLoad_{R1}$ can be a percentage of workloads 181 on the parallel processor resource R1 that have workload tags 133 that match those of the processor workload W. Based on ActualLoad, the conflict cost 135 considers the measure of compatibility between processor workload W and parallel processor resource R1. Where the parallel processor resource is saturated, $ConflictCost_{W\_R0}$ can also be calculated as $$Load_W * \frac{IncompatibleLoad_{R1}}{Load_{R1}}.$$

In terms of incompatible load, Equation (2) can be expressed as $$ActualLoad = Load_W * \frac{100\% - IncompatibleLoad_{R1}}{Load_{R1}}.$$

$IncompatibleLoad_{R1}$ can refer to processor workloads 181 of the processor resource R1 that are incompatible with processor workload W. As a result, $IncompatibleLoad_{R1}$ can be another measure of compatibility between processor workload W and parallel processor resource R1. For example, the $IncompatibleLoad_{R1}$ can be a percentage of workloads 181 on the parallel processor resource R1 that have workload tags 133 that differ from those of the processor workload W.

Where thread R1 is not saturated, or includes free cycles, ActualLoad can be calculated according to Equation (3).

$$ActualLoad = 100\% - Load_{R1} + CompatibleLoad_{R1} \quad (3)$$

This equation considers that processor workload W can run on processor resource R0 when processor resource R1 is idle, as well as when R1 is running compatible tags. In various embodiments, the clusters 106 can include a plurality of devices installed in racks of the cluster 106, which can make up a server bank, aggregate computing system, or a computer bank in a data center or other like facility. In some examples, the computing cluster can include a high-availability computing cluster. A high-availability computing cluster can include a group of computing devices that act as a single system and provides a continuous uptime for workloads. The devices in the clusters 106 can include any number of physical machines that perform workloads that include, virtual machines, virtual appliances, operating systems, drivers, hypervisors, scripts, and applications.

The devices in the cluster 106 can include, for example, memory and storage devices, hosts, switches, and other devices. Hosts can include graphics cards having one or more graphics processing units (GPUs) installed thereon, central processing units (CPUs), power supplies, and other components. In various examples, the cluster 106 can include requisite physical hardware and software to create and manage a virtualization infrastructure. The physical hardware for a host can include a CPU, graphics card (having one or more GPUs), data bus, memory, and other components. In some examples, the hosts can include a pre-configured hyper-converged computing device where a hyper-converged computing device includes pre-tested, pre-configured, and pre-integrated storage, server and network components, including software.

The hypervisor 156, which may sometimes be referred to as a virtual machine monitor (VMM), is an application or software stack that allows for creating and running virtual machines. Accordingly, a hypervisor 156 can be configured to provide guest operating systems with a virtual operating platform, including virtualized hardware devices or resources, and to manage the execution of guest operating systems within a virtual machine execution space provided on the host machine by the hypervisor 156. In some instances, a hypervisor 156 can be a type 1 or bare metal hypervisor configured to run directly on a host machine in order to control and manage the hardware resources 153. In other instances, the hypervisor 156 can be a type 2 or hosted hypervisor implemented as an application executed by an operating system executed by a host machine. Examples of different types of hypervisors include ORACLE VM SERVER™, MICROSOFT HYPER-V®, VMWARE ESX™ and VMWARE ESXi™, VMWARE WORKSTATION™, VMWARE PLAYER™, and ORACLE VIRTUALBOX®.

Figure 2A:
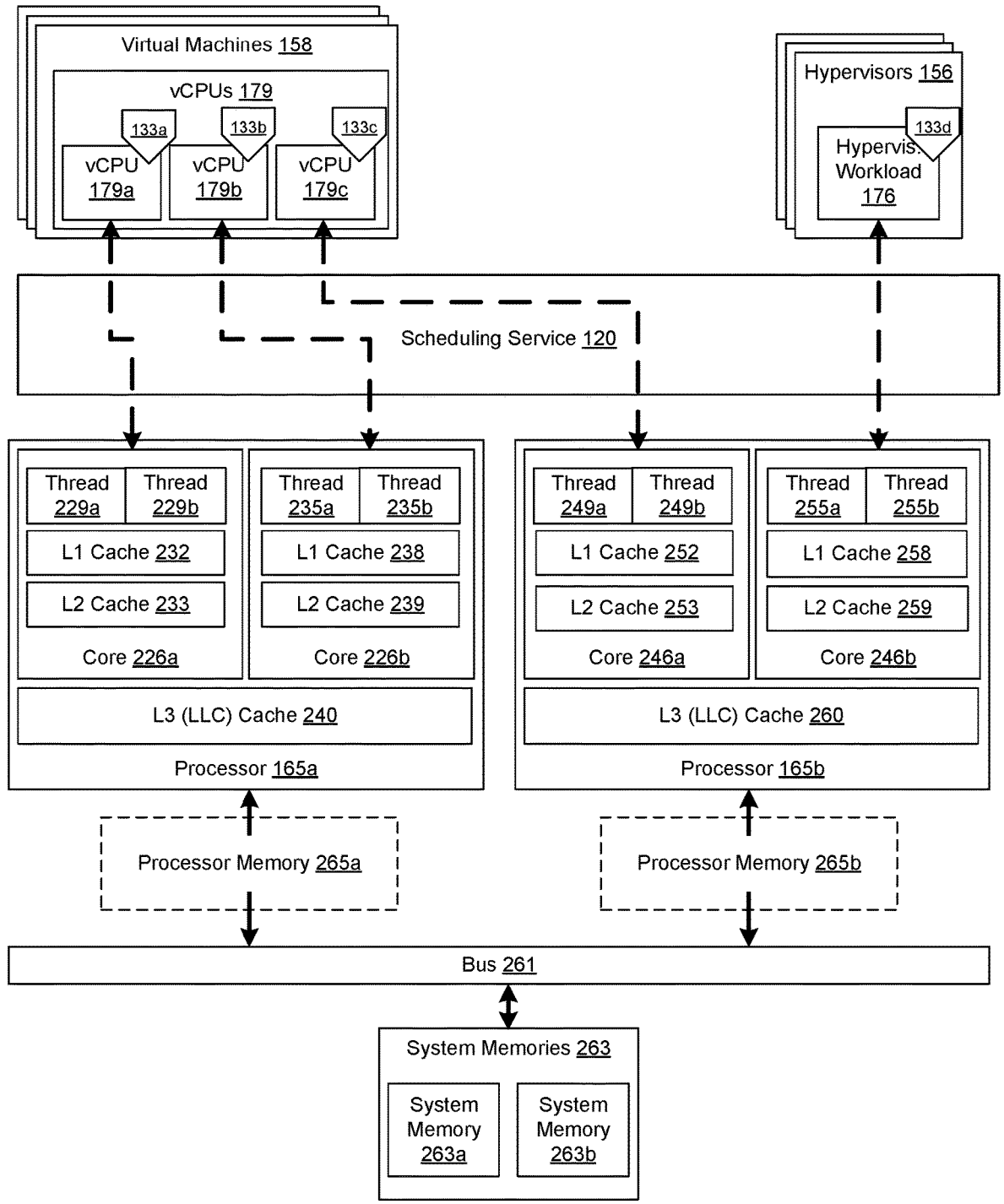
FIG. 2A is a drawing of an example of workload placement using components of the networked environment, according to various embodiments of the present disclosure.

FIG. 2A illustrates an example of workload placement using components of the networked environment 100 of FIG. 1. The virtual machines 158 can include VCPUs 179a . . . 179c. The hypervisors 156 can include hypervisor workload 176. The scheduling service 120 can assign a processor workload 181, such as a vCPU 179 or hypervisor workload 176, to a processor resource 170 based on workload tags 133, as well as information identified from the processor data 131 and workload data 132. Workload tags 133 can include the workload tags 133a . . . 133e. The scheduling service 120 can tag vCPU 179a with workload tag 133a. The scheduling service 120 can tag vCPU 179b with workload tag 133b. The scheduling service 120 can tag vCPU 179c with workload tag 133c. The scheduling service 120 can tag the hypervisor workload 176 with workload tag 133d.

The processors 165 can include the processor 165a and the processor 165b. The processor 165a can include cores 226, including core 226a and core 226b. Core 226a can be a multithreaded core such as Intel® hyperthreaded core with multiple threads or hyperthreads. For example, the core 226a can include a thread 229a and a thread 229b, collectively referred to as threads 229. While two threads are shown, any number of threads can be supported in a core of a mutlithreaded architecture. The core 226a can also include an L1 cache 232 and an L2 cache 233. The threads 229 of the core 226a can share the L1 cache 232 and L2 cache 233. Core 226b can include a thread 235a and a thread 235b, collectively referred to as threads 235. The core 226b can also include an L1 cache 238 and an L2 cache 239. The threads 235 of the core 226b can share the L1 cache 238 and L2 cache 239. The processor 165a can include an L3 or LLC cache 240. The cores 226a and 226b can share the L3 cache 240.

The processor 165b can include cores 246, including core 246a and core 246b. Core 246a can be a multithreaded core. For example, the core 246a can include a thread 249a and a thread 249b, collectively referred to as threads 249. The core 246a can also include an L1 cache 252 and an L2 cache 253. The threads 249 of the core 246a can share the L1 cache 252 and the L2 cache 253. Core 246b can include a thread 255a and a thread 255b, collectively referred to as threads 235. The core 246b can also include an L1 cache 258 and an L2 cache 259. The threads 255 of the core 246b can share the L1 cache 258 and the L2 cache 259. The processor 165b can also include an L3 or LLC cache 260. The cores 246a and 246b can share the L3 cache 260.

The processors 165a and 165b can also share memories over a bus 261. For example, in an UMA architecture, the processors 165a and 165b can share system memories 263 over the bus 261. The system memories can include system memory 263a and system memory 263b. In a NUMA architecture, the processor 165a can have a processor memory 265a, and the processor 165b can have a processor memory 265b. The processors 165a and 165b can share the processor memories 265a and 265b, collectively referred to as the processor memories 265.

The scheduling service 120 can define a memory level at which the tagged processor workloads 181 are enforced as compatible and incompatible. The scheduling service 120 can define the enforced memory level based on a known or potential memory vulnerability associated with that memory level. For instance, in order to prevent L1TF, scheduling service 120 can prevent memory sharing at an L1 cache memory level. As a result, the scheduling service 120 can prevent processor workloads 181 that have differing workload tags 133 from sharing the L1 caches 232, 238, 252, and 258. Protection at a core cache memory level can prevent processor workloads 181 that have differing workload tags 133 from sharing L1 and L2 caches. To protect against an L3 or processor cache vulnerability, the scheduling service 120 can prevent memory sharing at an L3 cache memory level, or a processor cache memory level. In that situation, the scheduling service 120 can prevent processor workloads 181 that have differing workload tags 133 from sharing the L3 caches 240 and 260. The scheduling service 120 can also prevent memory sharing at a bus-shared memory level such as a NUMA memory level or an UMA memory level to prevent memory vulnerabilities. The scheduling service 120 can prevent processor workloads 181 that have differing workload tags 133 from sharing the processor memories 265 (e.g., NUMA memories) or the system memories 263 (e.g., UMA memories) over the bus 261.

The scheduling service 120 can analyze the processor data 131 and the workload data 132 to determine that a number of processor workloads 181 scheduled to execute at a particular time is less than or equal to a number of processor resources 170 that include or share a memory at the protected memory level. This can indicate an under-committed status at the protected memory level because each processor workload 181 can be assigned to a separate processor resource 170 at the protected memory level.

As an example, where a protected memory level is an L1 cache level, a processor core can be the processor resource 170 that includes an L1 cache. The scheduling service 120 can determine that the computing environment is under-committed if the number of processor workloads 181 scheduled to execute at a particular time is less than or equal to a number of processor cores with L1 caches. The scheduling service 120 can determine that there are four processor workloads 181 including the vCPUs 179a-179c and hypervisor workload 176. The processors 165a and 165b include four total processor cores 226a, 226b, 246a, and 246b. Accordingly, the scheduling service 120 can identify an under-committed status at the L1 cache level. In order to minimize conflict cost 135, the scheduling service 120 can disable multithreading in this situation, because each processor workload 181 can be assigned to a separate processor core. The scheduling service 120 can then assign the vCPU 179a to core 226a, the vCPU 179b to core 226b, the vCPU 179c to core 246a, and the hypervisor workload 176 to core 246b. Because none of the L1 caches 232, 238, 252, or 258 are shared, the conflict cost 135 can be zero for each of the processor workloads 181.

Figure 2B:
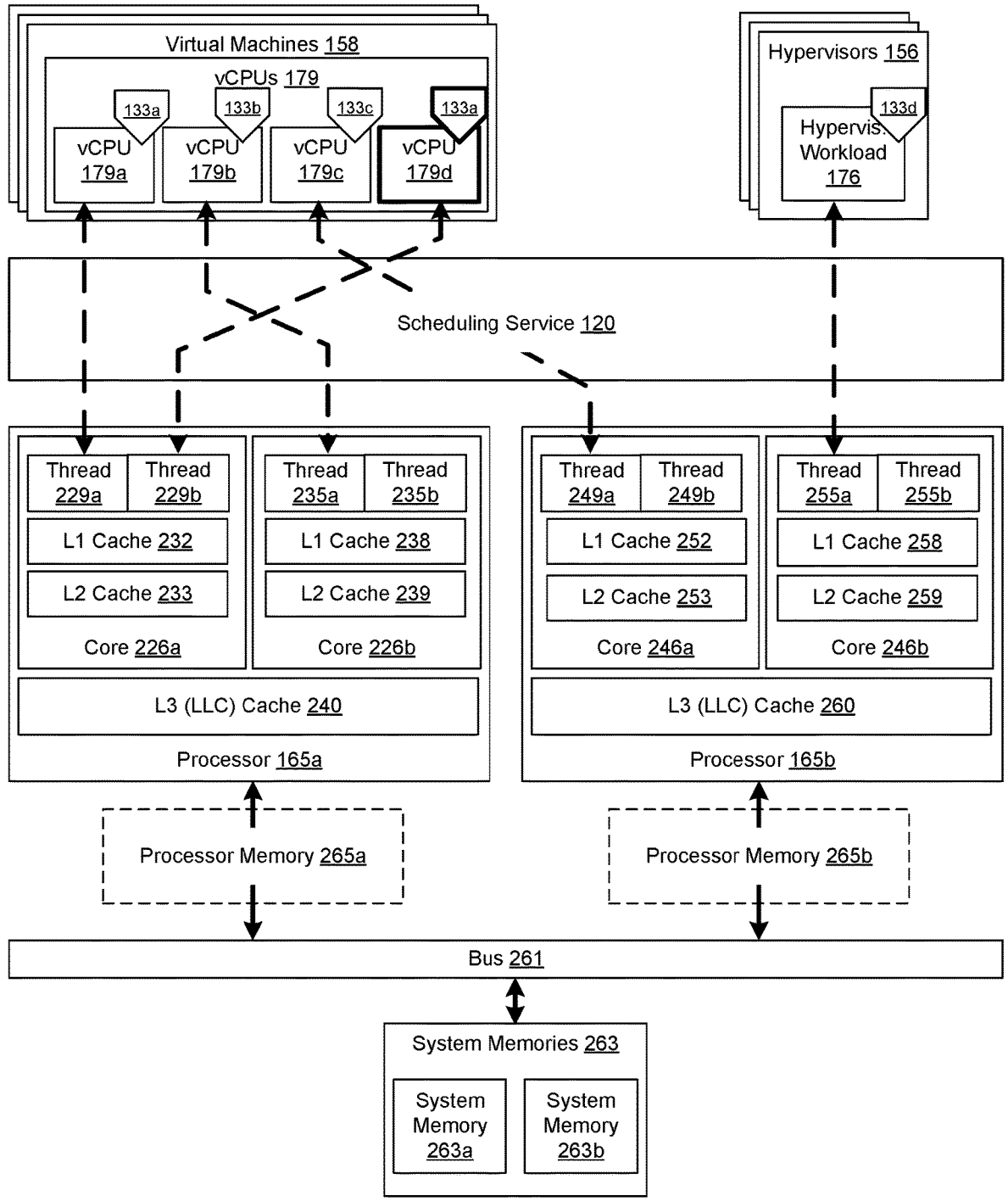
FIG. 2B is a drawing of another example of workload placement using components of the networked environment, according to various embodiments of the present disclosure.

FIG. 2B illustrates an example of workload placement using components of the networked environment 100 of FIG. 1. The virtual machines 158 can include vCPUs 179a . . . 179c. The hypervisors 156 can include hypervisor workload 176. The scheduling service 120 can assign a processor workload 181, such as a vCPU 179 or hypervisor workload 176, to a processor resource 170 based on workload tags 133, as well as information identified from the processor data 131 and workload data 132. Workload tags 133 can include the workload tags 133a . . . 133d. The scheduling service 120 can tag vCPU 179a with workload tag 133a. The scheduling service 120 can tag vCPU 179b with workload tag 133b. The scheduling service 120 can tag vCPU 179c with workload tag 133c. The scheduling service 120 can tag vCPU 179d with workload tag 133a, which matches vCPU 179a. The scheduling service 120 can tag the hypervisor workload 176 with the matching workload tag 133d. The processors 165, memories, and other system components can be similar to that described for FIG. 2A.

The scheduling service 120 can assign the vCPU 179a to thread 229a. The scheduling service 120 can assign the vCPU 179b to thread 235a. The scheduling service 120 can assign the vCPU 179c to thread 249a. The scheduling service 120 can assign the hypervisor workload 176 to thread 255a. Accordingly, the vCPUs 179a-179c and the hypervisor workload 176 can be currently executing.

The vCPU 179d is scheduled to be executed but is not yet assigned by the scheduling service. The vCPU 179d can have a workload tag 133a that matches the workload tag 133a of the vCPU 179a. In the situation where a protected memory level is an L1 cache level, a processor core can be the processor resource 170 that includes an L1 cache. The scheduling service 120 can analyze the processor data 131 and the workload data 132 to determine that a number of processor workloads 181 scheduled to be executed at a particular time is greater than a number of processor cores. Specifically, the processor workloads 181 scheduled to be executed can include five processor workloads 181, including the vCPUs 179a-179d and the hypervisor workload 176. However, the processors 165a and 165b include four total processor cores 226a, 226b, 246a, and 246b. The scheduling service 120 can enable or utilize multithreading for at least some of the processor resources 170 when the number of processor workloads 181 exceed a number of cores of processors 165. Generally, the scheduling service 120 can determine whether a number of processor workloads 181 exceeds a number of processor resources 170 at a protected memory level.

The scheduling service 120 can enable multithreading for a particular core, a particular processor, or a particular processor group. The scheduling service 120 can improve efficiency by minimizing a number of cores, processors, or processor groups that have multithreading enabled. For example, multithreading can be enabled at a core level, and the scheduling service 120 can enable multi-threading for cores 226a and 246b, while disabling multi-threading for cores 226b and 246a. Alternatively, multithreading can be enabled at a processor level, so that processor 165a, and all of its cores 226, can have multithreading enabled.

The scheduling service 120 can determine, based on the matching workload tags 133a, that the vCPUs 179a and 179d are compatible to concurrently execute on parallel threads 229a and 229b and share the L1 cache 232 of the core 226a. As a result, the conflict cost 135 can be minimized, according to the conflict functions 136, by assigning the vCPU 179d to execute on the core 226a with the vCPU 179a. Specifically, the scheduling service 120 can assign the vCPU 179d to the thread 229b.

Figure 3:
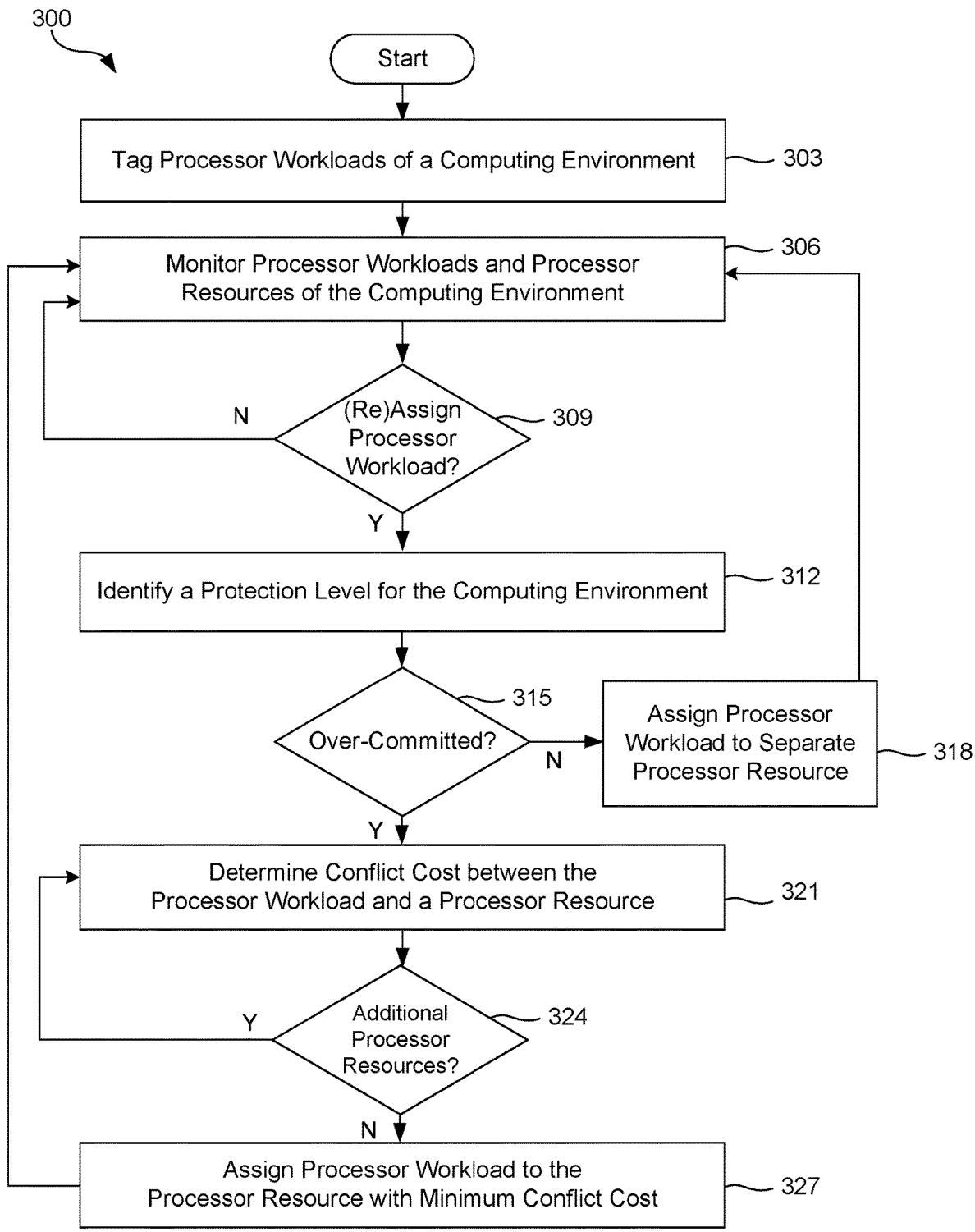
FIG. 3 is an example of a flowchart illustrating functionality implemented by various embodiments of the present disclosure.

FIG. 3 shows an example flowchart 300 describing steps that can be performed by the components of the networked environment 100 of FIG. 1. Generally, the flowchart 300 describes how a scheduling service 120 minimizes conflict cost 135 when assigning a processor workload 181 to execute in a computing environment 103.

In step 303, the scheduling service 120 can tag processor workloads 181 of the computing environment 103 using workload tags 133. Matching workload tags 133 can indicate that a set of processor workloads 181 are compatible, while differing workload tags 133 can indicate incompatibility. For example, the scheduling service 120 can tag processor workloads 181 according to enterprise, so that processor workloads 181 of all hypervisors 156 and all virtual machines 158 associated with the enterprise have matching tags. Alternatively, the scheduling service 120 can tag processor workloads 181 according to enterprise subdivision or another enterprise subcategory. In other cases, the scheduling service 120 can tag processor workloads 181 according to individual hypervisors 156 and virtual machines 158. Hypervisor workloads 176 from a particular hypervisor 156 can have matching workload tags 133, while the hypervisor workloads 176 of another hypervisor 156, and the vCPUs 179, can have workload tags 133 that differ from the matching set. The vCPUs 179 from a particular virtual machine 158 can have matching workload tags 133, while vCPUs 179 from another virtual machine 158, and the hypervisor workloads 176, can have workload tags 133 that differ from the matching set.

In step 306, the scheduling service 120 can monitor processor resources 170 and processor workloads 181 of the computing environment 103. For example, the scheduling service 120 can monitor and analyze processor data 131 and workload data 132 collected for the computing environment 103. Processor data 131 can include a record of the processor workloads 181, including hypervisor workloads 176 and vCPUs 179, assigned to each processor resource 170. Workload data 132 information can include an identifier or name of the processor workload 181, as well as a processor resource 170 where the processor workload 181 is assigned to be executed. Workload data 132 can also indicate the workload tags 133 that are associated with a particular processor workload 181.

In step 309, the scheduling service 120 can determine whether to assign or reassign a processor workload 181. For example, the scheduling service 120 can assign a processor workload 181 that is scheduled to be executed at the current time. Also, in some cases the scheduling service 120 can identify that a processor workload 181 has completed, and that a currently assigned processor workload 181 should be reassigned based on the completion of the processor workload 181. If the scheduling service 120 determines to assign or reassign a processor workload 181, then the process can move to step 312. If the scheduling service 120 determines no processor workload 181 is to be assigned or reassigned, then the process can move to step 306.

In step 312, the scheduling service 120 can identify a protection level for the computing environment 103. The scheduling service 120 can identify a setting or configuration of the computing environment 103 to identify the protection level. The protection level can be user-selected, for example, by selecting a user interface element of a management console of the scheduling service 120. The protection level can be a protected memory level. A protected memory level can indicate or be associated with a particular type of memory shared by a particular type of processor resource 170. A processor resource 170 at the protected memory level should not share a memory, at the protected memory level, with other processor resources 170. Alternatively, the protection level can be a protected process resource level that indicates or is associated with a particular type of processor resource 170. A processor resource 170 at the protected process resource level should not share a memory with other processor resources 170 at the protected process resource level.

In step 315, the scheduling service 120 can determine whether the computing environment 103 is over-committed. The scheduling service 120 can analyze the processor data 131 and the workload data 132 to compare a number of processor workloads 181 scheduled to execute at a particular time with a number of processor resources 170 that include or share a memory at the protected memory level. If the number of processor workloads 181 scheduled to execute at a particular time is less than a number of processor resources 170 at the protected memory level, the scheduling service 120 can determine that the computing environment 103 is under-committed, and can move to step 318. If the number of processor workloads 181 scheduled to execute at a particular time exceeds a number of processor resources 170 at the protected memory level, the scheduling service 120 can determine that the computing environment 103 is over-committed, and can move to step 321.

In step 318, the scheduling service 120 can assign a processor workload 181 to a separate processor resource 170 that includes its own dedicated memory at the protected memory level. That is, the separate processor resource 170 does not share a memory at the protected memory level. For example, a protected memory level can be an L1 cache level. As seen in FIG. 2A, thread 229a can share the L1 cache 232 with thread 229b at the L1 cache level. However, the core 226a includes its own dedicated L1 cache 232 that is not shared at the L1 cache level. The processor workload 181 is assigned to a separate processor resource 170 in that the separate processor resource 170 has no other processor workloads 181 assigned thereto. As a result, the processor workload 181 will not share the separate processor resource 170, or its memory at the protected memory level, with any other processor workloads 181. This minimizes conflict because there will be zero conflict cost 135 for the processor workload 181 when assigned to a separate processor resource 170.

In step 321, the scheduling service 120 can the scheduling service 120 can determine conflict cost 135 between the processor workload 181 and a particular processor resource 170 at a protected memory level. The scheduling service 120 can identify a parallel processor resource 170 that is parallel to the particular processor resource 170 by sharing a memory at the protected memory level. The scheduling service 120 can calculate conflict cost 135 as a difference between the unconflicted load of the processor workload 181 and actual load when placed on the particular processor resource 170. The conflict cost 135 can be calculated using a measure of compatibility between the processor workload 181 and the parallel processor resource 170.

For example, the protected memory level can be a core cache level, which can refer to an L1 and L2 cache level, and the particular process resource 170 can be the thread 229a of the core 226a. The parallel processing resource can be the other thread 229b of the core 226a. The two threads 229a and 229b can share a memory of the core 226a, such as the L1 cache 232. The scheduling service 120 can determine the conflict cost 135 to assign the processor workload 181 to the thread 229a using a measure of compatibility between the processor workload 181 and the parallel thread 229b. The measure of compatibility can be a percentage of processor workloads 181 on the parallel thread 229b that have workload tags 133 that match (or differ) from those of the processor workload 181.

In another example, the protected memory level can be a processor cache level or L3 cache level. The particular process resource 170 can be the core 226a of a processor 165a. The parallel processing resource can be the other core 226b of the processor 165a. The cores 226a and 226b can share a memory at processor cache level, such as the L3 cache 240. The scheduling service 120 can determine the conflict cost 135 to assign the processor workload 181 to the core 226a using a measure of compatibility between the processor workload 181 and the parallel core 226b. The measure of compatibility can be a percentage of processor workloads 181 on the parallel core 226b that have workload tags 133 that match (or differ) from those of the processor workload 181.

Further, the protected memory level can be a processor memory level, bus-shared memory level, or NUMA memory level. The particular process resource 170 can be a processor 165a. The parallel processing resource can be the processor 165b. The processors 165a and 165b can share a processor memory, bus-shared memory, or NUMA memory such as processor memory 265a. The scheduling service 120 can determine the conflict cost 135 to assign the processor workload 181 to the processor 165a using a measure of compatibility between the processor workload 181 and the parallel processor 165b. The measure of compatibility can be a percentage of processor workloads 181 on the parallel processor 165a that have workload tags 133 that match (or differ) from those of the processor workload 181.

The protected memory level can also be a bus-shared memory level, or UMA memory level. The particular process resource 170 can be a processor 165a. The parallel processing resource can be the processor 165b. The processors 165a and 165b can share a bus-shared memory or UMA memory such as the system memory 263a and 263b. The scheduling service 120 can determine the conflict cost 135 to assign the processor workload 181 to the processor 165a using a measure of compatibility between the processor workload 181 and the parallel processor 165b. The measure of compatibility can be percentage of workloads 181 on the parallel processor 165a that have workload tags 133 that match (or differ) from those of the processor workload 181.

In step 324, the scheduling service 120 can determine whether conflict cost 135 should be calculated for additional processor resources 170 of the computing environment 103. The scheduling service 120 can determine a conflict cost 135 for every processor resource 170 at the protected memory level, a predetermined number of the processor resources 170, or a subset of processor resources 170 that are below a predetermined utilization level. Alternatively, the scheduling service 120 can assign the processor workload 181 to the processor resource 170 if the most recently calculated conflict cost 135 is below a predetermined threshold. If additional processor resources 170 are to be determined, the process can move to step 321. Otherwise, the process can move to step 327

In step 327, the scheduling service 120 can assign the processor workload 181 to execute on the processor resource 170 that has a minimum conflict cost 135. For example, the scheduling service 120 can determine a number of conflict costs 135 corresponding to a number of processor resources 170. In order to minimize conflict, the scheduling service 120 can identify the minimum conflict cost 135 and cause the processor workload 181 to execute on the processor resource 170 associated with the minimum conflict cost 135. The process can move to step 306 and continue monitoring the computing environment 103.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the scheduling service 120, hypervisor 156, other services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions on an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semi-conductor media. More specific examples of a suitable computer-readable mediums include solid-state drives or flash memory. Further, any logic or application described herein, can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system comprising:
   at least one computing device comprising at least one processor and at least one data store;
   instructions stored in the at least one data store, wherein the instructions, when executed by the at least one processor, cause the at least one computing device to at least:
   identify a protected memory level for a computing environment comprising a scheduling service that assigns processor workloads to a plurality of processor resources corresponding to the protected memory level, wherein incompatible processor workloads are prohibited-from concurrently executing on parallel processor resources that share a memory at the protected memory level, the protected memory level specifying a memory type corresponding to: a level one cache, a level two cache, a level three cache, a last level cache, a non-uniform memory access (NUMA)-shared memory or a uniform memory access (UMA)-shared memory;

determine a plurality of conflict costs for a processor workload, a respective conflict cost corresponding to a respective processor resource of the plurality of processor resources, the respective conflict cost being determined based on a measure of compatibility between the processor workload and a parallel processor resource that shares, at the protected memory level, a particular memory with the respective processor resource; and assign the processor workload to execute on a processor resource associated with a minimum conflict cost of the plurality of conflict costs.

2. The system of claim 1, wherein the measure of compatibility is determined based on existing workloads assigned to execute on the parallel processor resource.

3. The system of claim 1, wherein the protected memory level is associated with protection of at least one of: level one caches, level two caches, level three caches, uniform memory access (UMA) memories, and non-uniform memory access (NUMA) memories.

4. The system of claim 1, wherein the plurality of processor resources comprise at least one of: threads that share level one caches, cores that share last level caches, processors that share UMA memories, and processors that share NUMA memories.

5. The system of claim 1, wherein the instructions, when executed by the at least one processor, cause the at least one computing device to at least:

tag a plurality of processor workloads with a corresponding plurality of workload tags, wherein processor workloads tagged with differing workload tags are incompatible, and processor workloads tagged with matching workload tags are compatible.

6. The system of claim 1, wherein the respective conflict cost is determined using a difference between an unconflicted load of the processor workload and an actual load of the processor workload when assigned to execute on the processor resource, the actual load being determined based on the measure of compatibility between the processor workload and the parallel processor resource.

7. The system of claim 1, wherein the instructions, when executed by the at least one processor, cause the at least one computing device to at least:

determine that the computing environment is overcommitted based on a number of processor workloads exceeding a number of the processor resources that share memories at the protected memory level.

8. A method comprising:

identifying a protected memory level for a computing environment comprising a scheduling service that assigns processor workloads to a plurality of processor resources at the protected memory level, wherein incompatible processor workloads are prohibited from concurrently executing on parallel processor resources that share a memory at the protected memory level, the protected memory level specifying a memory type corresponding to: a level one cache, a level two cache, a level three cache, a last level cache, a non-uniform memory access (NUMA)-shared memory or a uniform memory access (UMA)-shared memory;

determining a plurality of conflict costs for a processor workload, a respective conflict cost corresponding to a respective processor resource of the plurality of processor resources, the respective conflict cost being determined based on a measure of compatibility between the processor workload and a parallel processor resource that shares, at the protected memory level, a particular memory with the respective processor resource; and assigning the processor workload to execute on a processor resource associated with a minimum conflict cost of the plurality of conflict costs.

9. The method of claim 8, wherein the measure of compatibility is determined based on existing workloads assigned to execute on the parallel processor resource.

10. The method of claim 8, wherein the protected memory level is associated with protection of at least one of: level one caches, level two caches, last level caches, uniform memory access (UMA) memories, and non-uniform memory access (NUMA) memories.

11. The method of claim 8, wherein the plurality of processor resources comprise at least one of: threads that share level one caches, cores that share last level caches, processors that share UMA memories, and processors that share NUMA memories.

12. The method of claim 8, further comprising:

tagging a plurality of processor workloads with a corresponding plurality of workload tags, wherein processor workloads tagged with differing workload tags are incompatible.

13. The method of claim 8, wherein the respective conflict cost is determined using a difference between an unconflicted load of the processor workload and an actual load of the processor workload when assigned to execute on the processor resource, the actual load being determined based on the measure of compatibility between the processor workload and the parallel processor resource.

14. The method of claim 8, further comprising:

determining that the computing environment is overcommitted based on a number of processor workloads exceeding a number of the processor resources that share memories at the protected memory level.

15. A non-transitory computer-readable medium comprising machine readable instructions, wherein the instructions, when executed by at least one processor, cause at least one computing device to at least:

identify, by a scheduling service, a protected memory level for a computing environment comprising a plurality of processor resources at the protected memory level, the protected memory level indicating a memory type corresponding to: a level one cache, a level two cache, a level three cache, a last level cache, a non-uniform memory access (NUMA)-shared memory or a uniform memory access (UMA)-shared memory;

prohibit, by the scheduling service, a processor workload from executing on parallel processor resources that share a memory at the protected memory level, wherein at least one of the parallel processor resources executes an incompatible processor workload that is incompatible with the processor workload; and assign, by the scheduling service, the processor workload to execute on a processor resource selected from a subset of the plurality of processor resources that excludes the parallel processor resources that are prohibited for the processor workload.

16. The non-transitory computer-readable medium of claim 15, wherein a measure of compatibility is determined based on existing workloads assigned to execute on a parallel processor resource that is parallel to the processor resource.

17. The non-transitory computer-readable medium of claim 15, wherein the protected memory level is associated with protection of at least one of: level one caches, level two caches, level three caches, uniform memory access (UMA) memories, and non-uniform memory access (NUMA) memories.

18. The non-transitory computer-readable medium of claim 15, wherein the plurality of processor resources comprise at least one of: threads that share level one caches and level two caches, cores that share level three caches, processors that share UMA memories, and processors that share NUMA memories.

19. The non-transitory computer-readable medium of claim 15, wherein the instructions, when executed by the at least one processor, cause the at least one computing device to at least:

tag a plurality of processor workloads with a corresponding plurality of workload tags, wherein processor workloads tagged with differing workload tags are incompatible.

20. The non-transitory computer-readable medium of claim 15, wherein the instructions, when executed by the at least one processor, cause the at least one computing device to at least:

determine a respective conflict cost for a respective processor resource of the plurality of processor resources using a difference between an unconflicted load of the processor workload and an actual load of the processor workload when assigned to execute on the respective processor resource.

\* \* \* \* \*